Dec. 24, 1929.  W. BEUSCH  1,740,569
INDUCTION METER
Filed June 27, 1928
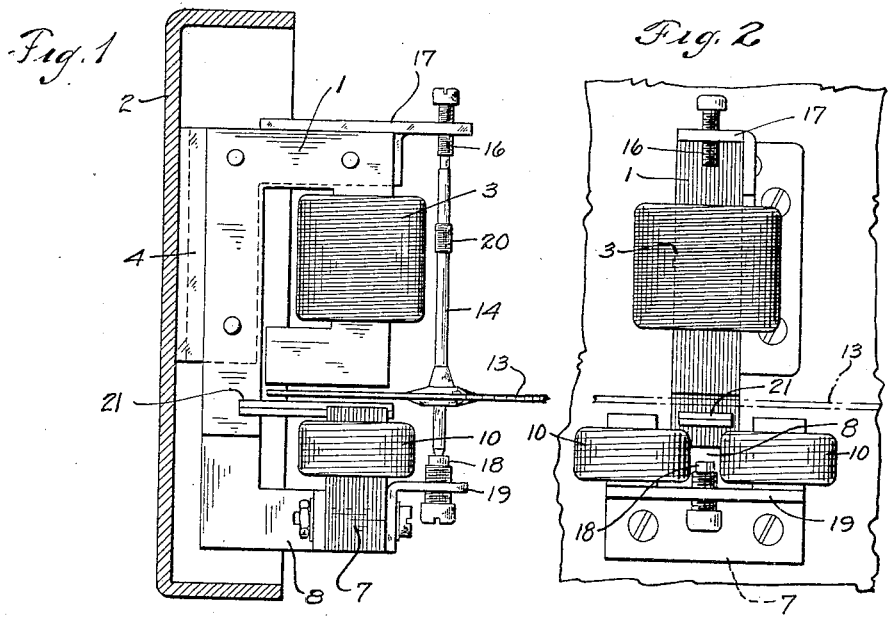
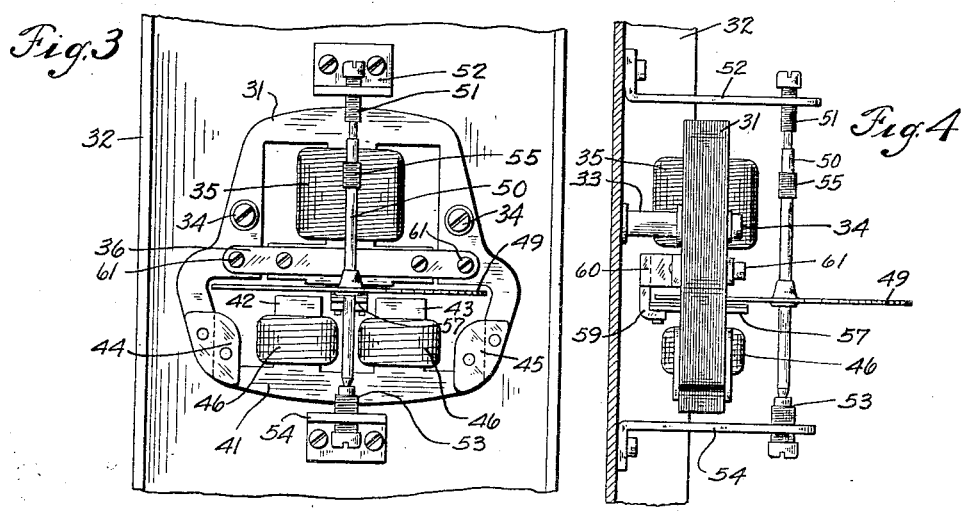
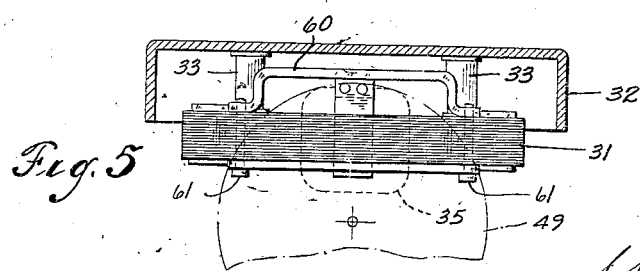
INVENTOR
W. Beusch
BY John D. Morgan
ATTORNEY Patented Dec. 24, 1929

1,740,569

UNITED STATES PATENT OFFICE

WILLI BEUSCH, OF ZUG, SWITZERLAND, ASSIGNOR TO LANDIS & GYR, A.-G., A LIMITED JOINT-STOCK COMPANY OF SWITZERLAND

INDUCTION METER

Application filed June 27, 1928, Serial No. 288,678, and in Switzerland September 9, 1927.

The invention relates to induction meters, and more especially to a novel and useful method and means for eliminating temperature errors in such meters.

Objects and advantages of the invention will be set forth in part hereinafter, in part are obvious herefrom and in part may be learned by practicing the invention; the same being realized and attained through the steps and instrumentalities pointed out in the appended claims.

The invention consists in the novel steps, method, parts, constructions, arrangements, combinations and improvements herein shown and described.

The accompanying drawings, herein referred to and constituting a part hereof, illustrate an embodiment of the invention, and together with the description serve to exemplarily disclose the invention and to explain the principles thereof.

Of the drawings:

Fig. 1 is an elevation of a part of a meter mechanism, embodying the invention;

Fig. 2 is a front elevation looking at Fig. 1 from the right;

Fig. 3 is a front elevation of a somewhat different form of meter mechanism embodying the invention;

Fig. 4 is a side elevation looking at Fig. 3 from the left; and

Fig. 5 is a top plan corresponding to Figs. 3 and 4.

The purpose of the present invention is to eliminate the errors in induction meters due to variations in temperature; and the present preferred embodiment is directed to method and means whereby the counter-pole of the pressure circuit is variably positioned by, or in response to, physical changes in a temperature-sensitive member, whereby the driving flux through the meter disc or armature is correspondingly controlled and varied, and therewith and thereby the torque exerted on the meter disc.

According to the broader aspects of the invention, a counter-pole, or counter-poles, of the pressure flux system comprises, or is connected to, or supported by a temperature-sensative metal plate, or coacting plates, so that with variations in the temperature of the meter the counter-pole will be moved toward or away from its magnet, or will be moved radially with respect to the meter disc, so as to vary the driving flux, or the torque, or both, correspondingly with the temperature changes in the meter, so as to eliminate resultant plus or minus error, whether the error with the rise in temperature is either plus or minus and conversely with decreases in temperature.

So far as concerns the broader features of the invention, the temperature-sensitive means whereby the counter-pole is variably positioned correspondingly with temperature changes, may be of any particular kind or form, but preferably said means comprises a construction of the counter-pole itself, or a mounting for the counter-pole, consisting of two or more pieces of metal having different temperature coefficients, or a single piece of metal having a relatively high temperature coefficient. Where the counter-pole itself consists of, or constitutes the temperature-sensitive means in whole or in part, said means must consist entirely or partially of ferro-magnetic metal, but where the temperature-sensitive means is merely a support for, or is connected to, the counter-pole, it may consist of some other kind of metal or metals.

Referring now in detail to the embodiment exemplarily illustrated in Figs. 1 and 2, a pressure core 1 is shown mounted in a meter casing 2, with a pressure coil 3 wound upon one limb thereof. The pressure core 1 is supported in any suitable manner, as by a bracket 4 fastened to the meter casing and to the pressure core. A current or driving core 7 is shown, of U-shape, and is mounted on a bracket 8 fastened to the current core and to the pressure core. A suitable current coil 10 is wound upon one or both limbs of the current core.

The driven meter elements may be of any desired form, and as shown the meter disc 13 is fixed on a spindle 14, journaled at its ends 16 and 18 in brackets 17 and 19, which brackets are fastened, respectively, to the pressure core and the current core. A worm 20 on spindle 14 forms the driving connection for the register.

In this embodiment, a counter-pole 21, consists of two metal strips, fastened together and having different temperature coefficients, one of the strips at least being of ferro-magnetic metal, and these strips are led into and fastened in a kerf formed in the lower part of the pressure core. One or both of the strips in such case would consist of iron, or a nickel alloy of iron, or any other suitable material. Where the temperature-sensitive device which controls the counter-plate is a separate element, it may consist of various materials, as for instance it may be made of a metal having a very high temperature coefficient, such as zinc.

Referring to the form of the invention shown exemplarily in Figs. 3 to 5, a three-armed pressure core 31 is mounted in a meter casing 32, in any suitable way, as by means of spacing studs 33 into which are screwed the core-supporting screws 34. A pressure coil 35 is wound upon the central limb of the pressure coil, and the pole terminal of this limb may be formed in any way desired. As shown, it has an enlarged head, adjacent to the meter disc, and extending toward both of the side arms or limbs of the core, leaving suitable air-gaps therebetween. A suitable magnetic shunt piece 36 may be provided if desired.

A current core 41, having two arms 42 and 43 is supported in any suitable manner, as by plates 44 and 45, from the ends of the outer arms of the pressure core. A current-winding 46 is wound upon each arm of the current core.

The meter disc 49 is fixed on a spindle 50, journaled at one end 51 in a bracket 52, fixed to the meter casing, and is journaled at its other end in a bearing 53 mounted in a bracket 54, fixed to the meter casing. A worm 55 is formed on the spindle as the driving connection for the register. The counter-pole 57 is shown consisting of two strips of metal, having different temperature coefficients, and these are mounted on a downwardly and inwardly-extending arm 59, fixed to cross-bracket 60, mounted on the rear side of the pressure core and fastened thereto by suitable means such as screws 61.

The invention in its broader aspects is not limited to the specific mechanism shown and described but departures may be made therefrom within the scope of the accompanying claims without departing from the principles of the invention and without sacrificing its chief advantages.

What I claim is:—

1. An induction meter including in combination a meter disc, a current magnet, a pressure magnet, and a counter pole and means including a plurality of metal strips having different temperature coefficients for automatically varying the action of the counter pole to compensate for temperature variations.

2. An induction meter including in combination a meter disc, a current magnet, a pressure magnet, and a counter pole and means including a plurality of metal strips having different temperature coefficients for automatically moving the counter pole to compensate for temperature variations.

3. An induction meter including in combination a meter disc, current and pressure magnets, a counterpole and means for automatically positioning the counterpole in accordance with changes of temperature to compensate for temperature variation.

4. An induction meter including in combination a meter disc, current and pressure magnets, and an automatically movable temperature controlled counterpole for compensating for variations in temperature.

In testimony whereof, I have signed my name to this specification.

WILLI BEUSCH.